US011227455B2

(12) United States Patent
Mutch et al.

(10) Patent No.: US 11,227,455 B2
(45) Date of Patent: Jan. 18, 2022

(54) DISTRIBUTED CLONING TOOL ASSEMBLY, SYSTEM, AND METHOD FOR REPLICATION OF VEHICLE ACCESS DEVICES

(71) Applicant: HY-KO PRODUCTS COMPANY, Northfield, OH (US)

(72) Inventors: William R. Mutch, North Ridgeville, OH (US); Justin A. Gill, Northfield, OH (US); Thomas F. Fiore, Willowick, OH (US); Randall A. Porras, Avon, OH (US); Benjamin Iwasevic, Northfield, OH (US)

(73) Assignee: HY-KO PRODUCTS COMPANY LLC, Portage, MI (US)

( * ) Notice: Subject to any disclaimer, the term of this patent is extended or adjusted under 35 U.S.C. 154(b) by 0 days.

(21) Appl. No.: 16/356,313

(22) Filed: Mar. 18, 2019

(65) Prior Publication Data

US 2019/0287332 A1 Sep. 19, 2019

Related U.S. Application Data

(60) Provisional application No. 62/644,545, filed on Mar. 18, 2018.

(51) Int. Cl.

*H04L 9/08* (2006.01)
*G07C 9/00* (2020.01)

(52) U.S. Cl.

CPC ..... *G07C 9/00857* (2013.01); *G07C 9/00309* (2013.01); *G07C 2009/00412* (2013.01);

(Continued)

(58) Field of Classification Search

CPC ............ G07C 9/00309; G07C 9/00571; G07C 2009/00793; G07C 9/00174; G07C 2009/00412; G07C 9/00857; G07C 9/00944; G07C 2009/00341; G07C 2009/00373; G07C 2009/0042; G07C 2009/00515; G07C 2009/00547;

(Continued)

(56) References Cited

U.S. PATENT DOCUMENTS 5,749,253 A * 5/1998 Glick ................ G07C 9/00571 70/278.2
6,501,369 B1 * 12/2002 Treharne ................ B60R 25/24 307/10.5

(Continued)

*Primary Examiner* — Dionne Pendleton

(74) *Attorney, Agent, or Firm* — McDonald Hopkins LLC

(57) ABSTRACT

Provided is a system and method for duplicating a master key for a vehicle. The system includes determining that a first device is communicating with a t/r device, the t/r device including an antenna for communicating with the master key. A cloning application associated with said t/r device may be operating on the first device. The t/r device may retrieve security information from said master key. The cloning application may communicate the security information for said master key to said central network system. The central network system may generate duplicate security information. The central network system may communicate the duplicate security information to the cloning application. The cloning application may transmit the duplicate security information to the t/r device to program a duplicate master key with the duplicate security information.

6 Claims, 8 Drawing Sheets

(52) U.S. Cl.
CPC .............. *G07C 2009/00587* (2013.01); *G07C 2009/00793* (2013.01)

(58) Field of Classification Search
CPC ........... G07C 2009/00587; G07C 2009/00865; G07C 2009/0092; G07C 2209/62; G07C 9/00896; G07C 2009/00992; H04W 12/06; H04W 4/023; H04W 4/80; H04W 12/00503; H04W 12/0605; H04W 12/0608; H04W 12/08; H04W 4/00; H04W 80/04; G06Q 20/18; G06Q 20/14; H04L 63/0492; H04L 63/06; H04L 63/083; H04L 63/0861; H04L 63/101; H04L 63/107; H04L 9/0894; H04L 9/321; H04L 9/08; B23C 2235/12; B23C 2235/28; B23C 2235/41; B23C 3/35; B23P 15/005; B60L 15/2072; B60L 2220/54; B60L 2250/20; B60L 2270/32; B60L 2270/38; B60L 3/00; B60L 3/04; B60L 53/14; B60L 53/24; B60L 53/305; B60L 53/65; B60L 53/665; B60L 58/12; E05B 17/004; E05B 19/00; E05B 19/0058; E05B 19/04; E05B 19/14; E05B 19/24; F02N 11/0807; G06F 13/4081; G06F 13/4208; G06F 21/31; G06F 21/32; G06F 21/34; G06F 21/35; G06F 21/6218; G06K 2209/19; G06K 7/1413; G06K 9/00; G06K 9/2036; G07F 15/005; G07F 17/0014; G07F 17/26; G08B 25/14; G08C 19/00; G09C 1/00; Y02T 10/64; Y02T 10/70; Y02T 10/7072; Y02T 10/72; Y02T 90/12; Y02T 90/14; Y02T 90/16; Y02T 90/167; Y02T 90/169; Y04S 30/14; Y10T 409/300952; Y10T 70/7842; B60R 25/24

See application file for complete search history.

(56) References Cited

U.S. PATENT DOCUMENTS

| | | | | |
|---|---|---|---|---|
| 7,849,721 | B2 | 12/2010 | Bass | |
| 7,890,878 | B2 | 2/2011 | Bass | |
| 8,634,655 | B2 | 1/2014 | Thompson | |
| 8,644,619 | B2 | 2/2014 | Thompson | |
| 9,558,236 | B1 * | 1/2017 | Hagen | G06K 9/6288 |
| 9,818,041 | B2 | 11/2017 | Mutch | |
| 9,963,908 | B2 | 5/2018 | Bass | |
| 2016/0321632 | A1 * | 11/2016 | Moore | G06F 21/6218 |
| 2020/0013241 | A1 * | 1/2020 | Johnson | B60R 25/248 |

* cited by examiner

DISTRIBUTED CLONING TOOL ASSEMBLY, SYSTEM, AND METHOD FOR REPLICATION OF VEHICLE ACCESS DEVICES

CROSS-REFERENCE TO RELATED APPLICATION

This application claims priority to U.S. Provisional Application No. 62/644,545 entitled "DISTRIBUTED CLONING TOOL ASSEMBLY, SYSTEM, AND METHOD," filed on Mar. 18, 2018, which is incorporated herein by reference in its entirety.

FIELD OF THE INVENTION

The present invention is generally related to a distributed cloning system, and method for replacement, generation, or reprogramming of vehicle access devices, such as transponder keys or remotes.

BACKGROUND

Most vehicles include an engine control module (ECM) that controls access and operation of the vehicle. A regular component of an ECM is an immobilizer system. The immobilizer system prevents the vehicle from opening, starting and operating unless and until an authorized key is placed within or near the vehicle or otherwise communicates with the vehicle.

These systems involve wireless communication of codes, typically using close field connection like transformer inductance or radio frequency. Vehicle access devices and immobilizer systems often involve a transponder component or other feature that operates through such electromagnetic radiation. These systems include an electronic security device fitted to an automobile that prevents the engine from running unless a valid transponder key is present. This reduces the risk of a vehicle from being "hot wired" after entry has been achieved and thus reduces motor vehicle theft. When the transponder key with the proper code is inserted in the vehicle ignition switch, for example, or comes within close proximity of the vehicle, it communicates codes with the electronic control module and the immobilizer system to unlock and activate the vehicle. These codes may be simple fixed codes or may be an encrypted authentication sequence.

Most vehicle manufacturers have developed their own system for this combination of immobilizer electronics and corresponding key, remote, or similar device. From time to time, a vehicle owner will lose or break these devices or need an additional one to operate the vehicle and need to purchase a new one. This can be complicated and expensive endeavor.

For example, vehicles may use original equipment manufacturer (OEM) programming tools to communicate or plug into the On-Board Diagnostic (OBD) port tools in order to program the new key to the immobilizer to allow access and/or to start the vehicle. Locksmiths typically utilize aftermarket programming tools that often utilize hacking techniques on certain vehicle models to bypass the OEM security protocol of that vehicle (e.g. PIN codes and/or time delays). This enables access to the vehicle's ECM to reprogram to accept a new access device. These processes require expensive equipment and significant training and expertise in order to successfully program a variety of vehicle types.

Aftermarket key manufacturers, however, have developed methods to clone many of the vehicles keys. Using cloning tools, you can read an existing working transponder key and create an electronic duplicate so that the new key will behave exactly like the original. As such, the vehicle immobilizer will allow the new key to start the vehicle. Such cloning systems have been used for years in retail store environments. The equipment is typically less expensive and much easier to use than the OEM/locksmith-like OBD programming tools. However, a consumer must physically go to such a retail store in order to have a key cloned.

This disclosure provides a distributed cloning system for duplicating access devices such as transponder keys for a vehicle. Such a system may be cost effective and allow consumers to duplicate a transponder key (for example) without having physically go to a location that has a transponder cloning tool such as a hardware store, auto parts store, or locksmith. There is a need to reduce the cost of effectively duplicating particular transponder keys and a need to offer such services using on-line selling and fulfillment.

SUMMARY

Provided is a system and method for duplicating an access device for a vehicle. The system includes a first computing device that is configured for communicating with a transmitter/receiver device ("t/r device"). The t/r device includes an antenna configured for communicating with an access device for a vehicle. A cloning application associated with said t/r device may be operating on the first computing device. The cloning application may be a software application that is configured to electronically communicate with the t/r device. The t/r device may transmit and/or receive security information from said access device. The cloning application may communicate the security information related to said access device to a network server. The network server may generate cloning security information. The network server may communicate the cloning security information to the cloning application. The cloning application may transmit related cloning security information to the t/r device. The t/r device may transmit said related cloning security information to a duplicate access device in order to program said duplicate access device for said vehicle.

In response to retrieving, by the t/r device, security information from said access device, the cloning application may determine whether the security information is encrypted. If not encrypted, the cloning application may then process the security information to generate cloning security information. If the security information is encrypted, the cloning application may generate the cloning security information locally when capable. In response to communicating, by the cloning application, the security information for said access device to said network server, the network server may determine whether the security information is encrypted, and may generate the cloning security information.

In one embodiment, at least one image of a blade of a master key may be captured and communicated to a network server. A duplicate blade of said key may be cut by a service provider to generate the generically programmed duplicate key. The generically programmed duplicate key may be provided to a customer along with the t/r device. Said customer may then use the cloning application on said first computing device to program said generically programmed duplicate key. In one embodiment, authentication sample data may be generated to create the cloning security information. A data collection device or the generically programmed duplicate key may be placed in proximity with said vehicle to sample communications between said data collection device or said generically programmed duplicate key and a vehicle communications interface to record the authentication sample data. The authentication sample data may be communicated to the network server to generate the cloning security information wherein said cloning security information may be transmitted to the cloning application. The cloning application may communicate with the t/r device to program the generically programmable duplicate key and transform it into a cloned duplicate key.

In one embodiment, provided is a non-transitory computer-readable storage medium storing executing instructions that, when executed, cause a cloning application to perform steps comprising: determining that a first device of a customer is communicating with a t/r device, the t/r device including an antenna for communicating with a master key for a vehicle; retrieving security information from said master key; communicating security information related to said master key to said network server; generating a cloning security information; and transmitting the cloning security information to the t/r device to program a generically programmable duplicate key with the cloning security information; and a processor configured to execute the instructions.

In another embodiment, provided is a t/r device comprising a housing including a computing device communication module, a battery, and a vehicle access device communication module. The vehicle access device communication module may electronically connect to an antenna configured to communicate with a master key for a vehicle. The antenna includes a first coil configured to communicate on one frequency with said master key for a vehicle and a clonable duplicate key that operates on a first frequency. The antenna may include a second coil configured to communicate on a second frequency with said master key for a vehicle and a clonable duplicate key that operates on a second frequency.

BRIEF DESCRIPTION OF THE DRAWINGS

The disclosed method and system may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention, including the incorporation into a single unitary device or partitioning into any number of local or remote networked devices. In addition, each communication link between devices may be wired or wireless. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

The present system described in this application involves components and methods for producing a suitable access device/master key 20 to replace or supplement the original ones that came with a vehicle having an immobilizer system. Such vehicles typically include an original key that is a suitable match for the vehicle, commonly referred to as the master key. This typically is the original key that was shipped with the vehicle from the factory or the vehicle's original equipment manufacturer (OEM). These master keys 20 referred to herein include an electronic access device 22 that includes electronic security information and may be such things as a transponder key, an integrated remote head key (IHRK), a Finger Operated Button Integrated Key (FOBIK), a proximity key, a smart phone, a universal remote, and/or any combination thereof. Some master keys 20 also may include a blade 24 having a pattern of bittings and grooves thereon that are patterned to correspond to tumbler members, typically pins or wafers, within an ignition of a vehicle. For purposes of clarity herein, the master key 20 may include either or both the electronic access device 22 that includes a transponder having the secure information thereon that assists to operate a vehicle and the patterned blade 24 compatible with a particular tumbler member of that vehicle's ignition.

Figure 1:
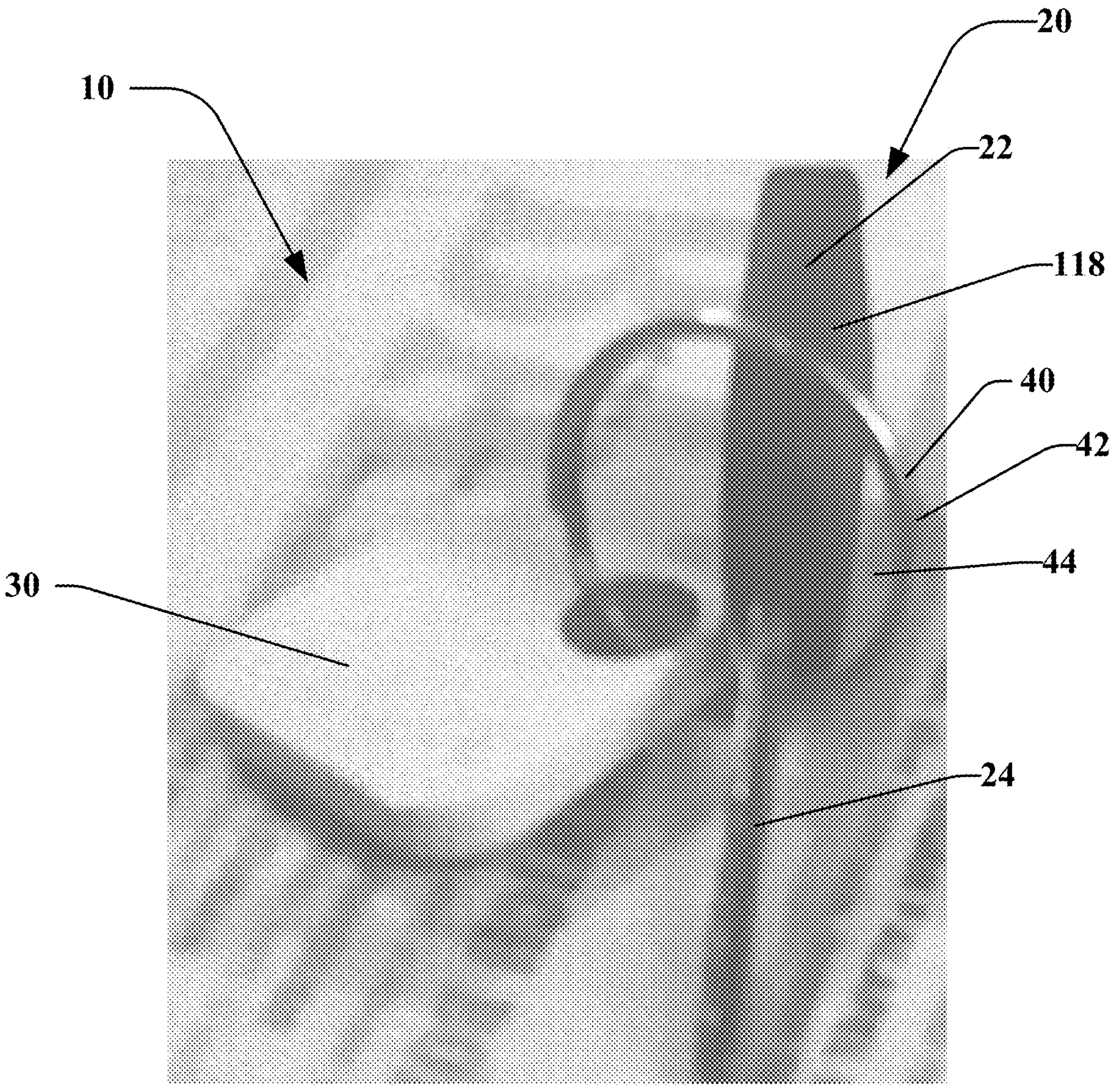
FIG. 1 is an image of an embodiment of a t/r device in accordance with the present disclosure.

FIG. 1 is an image of a transmitter/receiver device ("t/r device") 10 that may be used to duplicate the electronic access device 22 of the master key 20 for a vehicle 110. The t/r device 10 may include a housing 30 and an antenna 40. The housing 30 may include components to function as a communication link between the antenna 40 and a computing device 100. The t/r device 10 may be a part of a system and method for duplicating the master key 20 including both the electronic access device 22 and the patterned blade 24. This system and method may include a reduced complexity over other known key duplication systems. The t/r device 10 may be used in a system 200 that allows a consumer to program their own electronic access device 22' of a generically programmable duplicate key 50 without having to travel to a retail location or without the assistance of a trained sales associate or locksmith.

In one embodiment, the housing 30 of the t/r device 10 includes electronic components configured to provide a communication link between the computing device 100 and the electronic access device 22. The housing 30 may be permanently or releasably attached to the antenna 40. The housing 30 may be a small device made of a rigid material such as polymer, plastic, ceramic, glass, metal or the like that allows for a wired or wireless electronic communication to the computing device 100. The t/r device 10 including the housing 30 and antenna 40 may be any known configuration and may be compact and portable to allow a user to easily transport and store the t/r device 10.

Figure 2:
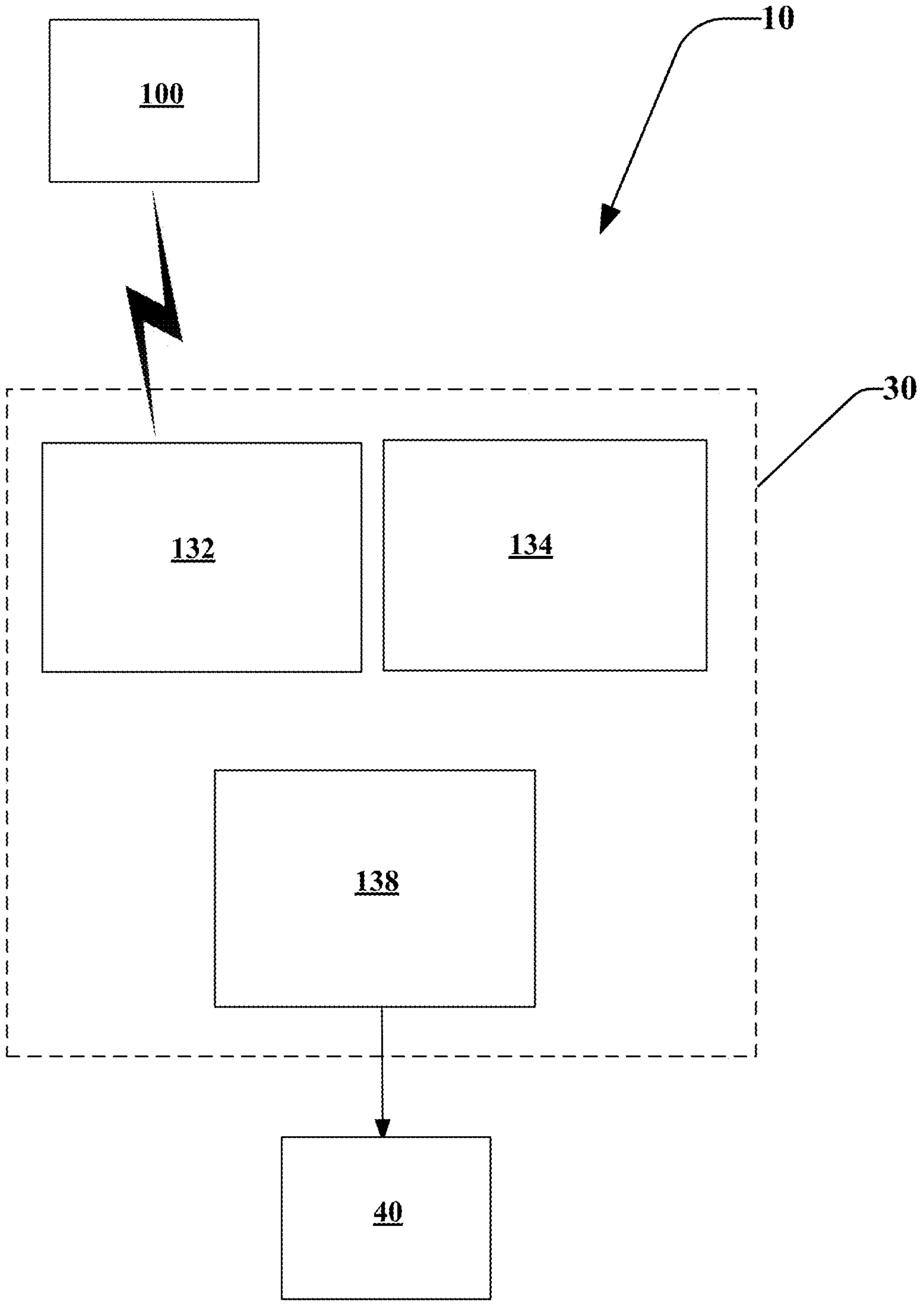
FIG. 2 is a block diagram of embodiments of said t/r device in accordance with the present disclosure.

In one embodiment, as illustrated by FIG. 2, the components within the housing 30 may include a computing device communication module 132, a battery 134, and a vehicle access device communication module 138. The computing device communication module 132 may be configured to electronically communicate with the computing device 100 in a wired manner such as USB, Ethernet, or other wired communication protocol or to communicate in a wireless manner such as via Bluetooth™, Wi-Fi, cellular link, or other wireless communication protocol. The battery 134 may be able to power the electronic components within the housing 30 and may be rechargeable. The computing device communication module 132 may be electronically connected to the battery 132 to transmit power for recharging or to the other electronic components within the housing 30 to power those components. The vehicle access device communication module 138 may allow for the selective electronic attachment to the antenna 40. Also, the vehicle access device connection module 138 may include components for operating the antenna 40 to allow it to operate as both a transmitter and as a receiver for signals transmitted or received with the electronic access device 22 and a generically programmed duplicate electronic access device 22' as will be described below.

The antenna 40 may similarly be a small device configured to be permanently or selectively attached to the housing 30. In one embodiment, the antenna 40 is a near field antenna. This antenna 40 may be any configuration but may include a coil that includes a plurality of wire windings wound in a coil shape and defining a coil axis therein. In this embodiment, the antenna 40 may be configured to communicate with the electronic access device 22 by electromagnetic coupling. In one embodiment, the electronic access device 22 may be inserted within an aperture defined by the coil antenna such that the electronic access device 22 may be aligned with the coil axis such that the windings of the antenna 40 may generally surround the electronic access device 22. In another embodiment, the antenna 40 may include a plurality of coil type antennas wherein each coil antenna may be configured to communicate with an electronic access device 22 over a different frequency wavelength depending on the type of electronic access device 22 is to be programmed or duplicated. This disclosure is not limited in this regard as the different antennas 40 may be co linearly aligned along a common coil axis and may have different dimensions, diameters or shapes.

Notably, the antenna 40 may include an insulator cover 42 which may protect the coil and wire windings of the antenna 40. The insulator cover 42 may be shaped to define an aperture 44 therethrough and configured to surround the electronic access device 22. Also, it is contemplated that the antenna 40 may be any type of antenna configured to electronically communicate with the electronic access device 22. As such, the antenna 40 may be a near field or a far field type of antenna and can electronically or magnetically couple to the electronic access device 22 via inductive, capacitive, radio frequency (RFID), or other electronically coupling means.

The computing device 100 may be a cell phone, smartphone, lap top, tablet, computer, smartwatch, or other general computing device. The computing device 100 may be any device that includes a processor and an ability to electronically communicate with other electronic devices. The computing device 100 may include a camera, or may be able to communicate with a camera (not shown), to take images of the blade 24 of the master key 20.

Figure 3:
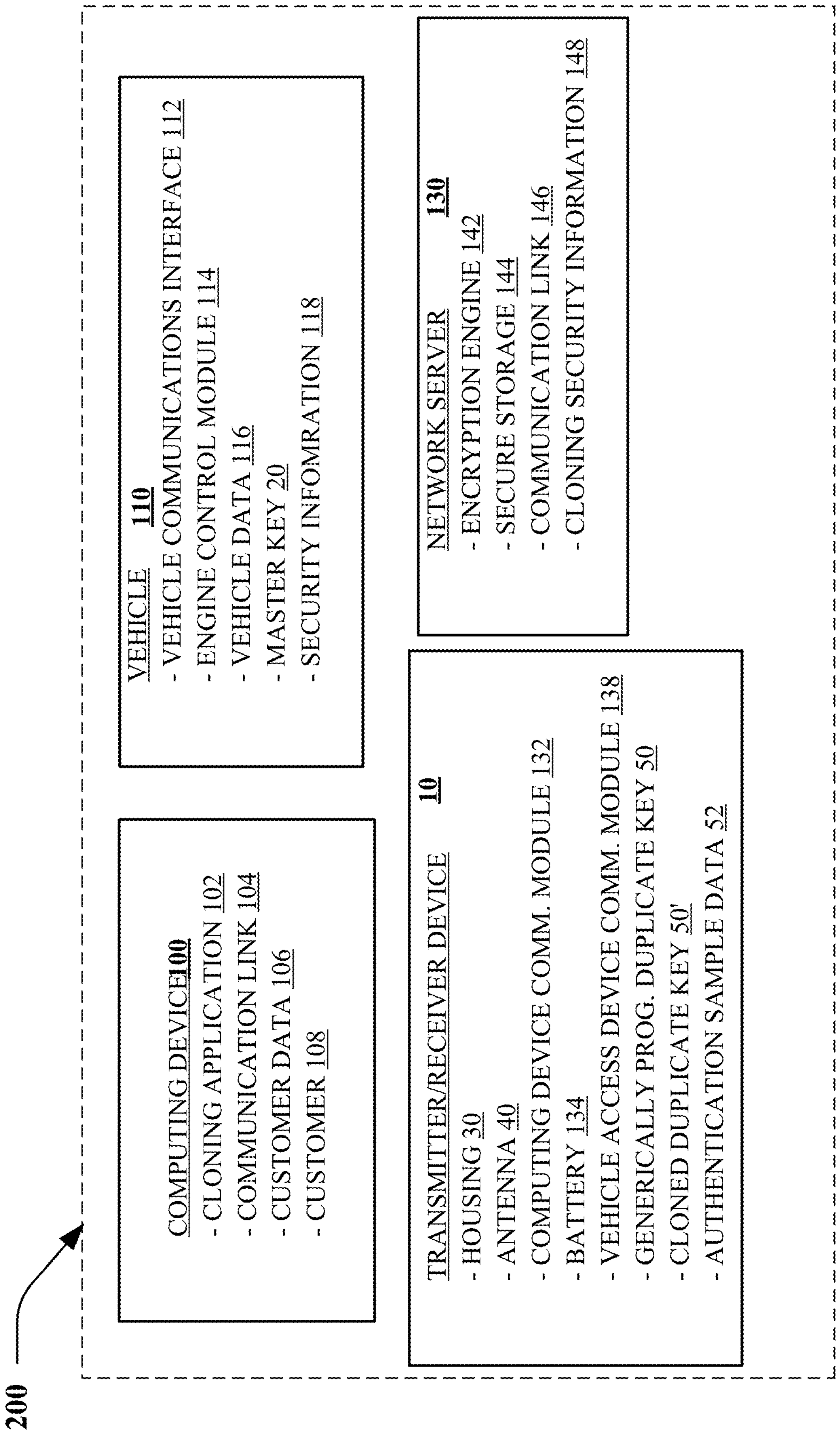
FIG. 3 is a block diagram of embodiments of a system for duplicating of a master key in accordance with the present disclosure.

As illustrated by FIG. 3, the system 200 may include a variety of components in order to duplicate the master key 20. The system 200 may include the computing device 100, the vehicle 110, the t/r device 10, a network server 130, and the generically programmable duplicate key 50. In operation, a customer 108 may need to duplicate the master key 20 associated with the vehicle 110. Following is a description of the steps for procuring a duplicate key that is programmed with the necessary security information associated with the vehicle 110 and the master key 20.

As illustrated by FIGS. 3-6, the customer 108 may install a cloning application 102 in the computing device 100. The cloning application 102 may be a software program or may include a non-transitory computer-readable storage medium for executing instructions that, when executed, cause a cloning application to perform programmable steps. The cloning application 102 may prompt the customer to enter customer data 106 related to the customer's identity or the type of vehicle 110 and master key 20 as well as vehicle data 116. See FIG. 3. The cloning application 102 may have a communication link 104 for communicating various data to the network server 130.

The customer data 106 may be communicated to the network server 130 to confirm that the customer 108 is positively associated with the vehicle 110. This system 200 may also include some form of positive identification with such things as biometrics such as fingerprint, facial recognition, or could be a photo identification such as driver's license which could be swiped, copied, or photographed, and processed for data input to the network server 130. The network server 130 may communicate with third party databases to positively associate the customer 108 with the vehicle 110 to ensure a secure duplication of the master key 20. The customer data could include information such as, for example, social security number, driver's license number, name and address, vehicle registration, insurance card information, etc. The customer data 106 could be input by scanning, data entry, optical character recognition, or a facial photograph or the like.

The vehicle data 116 may include such things as the year, make, model of the vehicle (YMM), the vehicle registration, the vehicle identification number (VIN), the license plate number, etc. Sometimes this vehicle identity or a portion of it can be derived from the master key 20. This vehicle information 116 may also be input through various input means to the computer device 100 itself by input, scan, or otherwise downloaded by third party databases.

In embodiments, where the master key 20 includes a blade 24, the customer 108 may capture a plurality of images 120 of the blade 24 and communicate those images 120 to the cloning application 102 on the computing device 100. The customer data 106 may include images 120 of the blade and be transferred to the network server 130. The network server 130 may analyze the customer data 106 and images 120 of the blade 24 and identify a particular type of generically programmed duplicate key 50 that may be associated with the vehicle 110. In embodiments, where the master key 20 includes a blade 24, a duplicate blade 24' may be cut by a service provider and assembled with the generally programmed duplicate key 50 along with a blank duplicate electronic access device 22'. The cutting of the duplicate blade 24' may be performed by a service provider with access to information received through the network server 130 or by a data key as identified in commonly owned U.S. Pat. No. 9,963,908 incorporated herein by reference. The generically programmable duplicate key 50 and cut duplicate blade 24' can be provided to the consumer 108 along with the t/r device 10 that can be used to program (or clone) the generically programmed duplicate key 50. In embodiments where the master key 20 does not include a blade 24, then this step may only include the transfer of customer data 106 and vehicle data 116 to allow the network server 130 or cloning application 102 to identify a proper generically programmed duplicate key 50.

The t/r device 10 may be provided to the customer 108 along with the generically programmed duplicate key 50 (and cut duplicate blade 24') so that the consumer 108 can program their own generically programmed electronic access device 22' of the generically programmed duplicate key 50 without having to go to a retail store and without a locksmith. Once the customer receives the t/r device 10 and the generically programmed duplicate key 50 (with or without a duplicate blade 24' depending on the master key 20 to be duplicated), the customer 108 can use the computing device 100 and cloning application 102 to program or clone the generically programmed duplicate key 50. The t/r device 10 may be placed in electronic communication with the terminal device 100 via the computing device communication module 132. This electronic communication may be wired or wireless and in one embodiment is via Bluetooth™.

Figure 4:
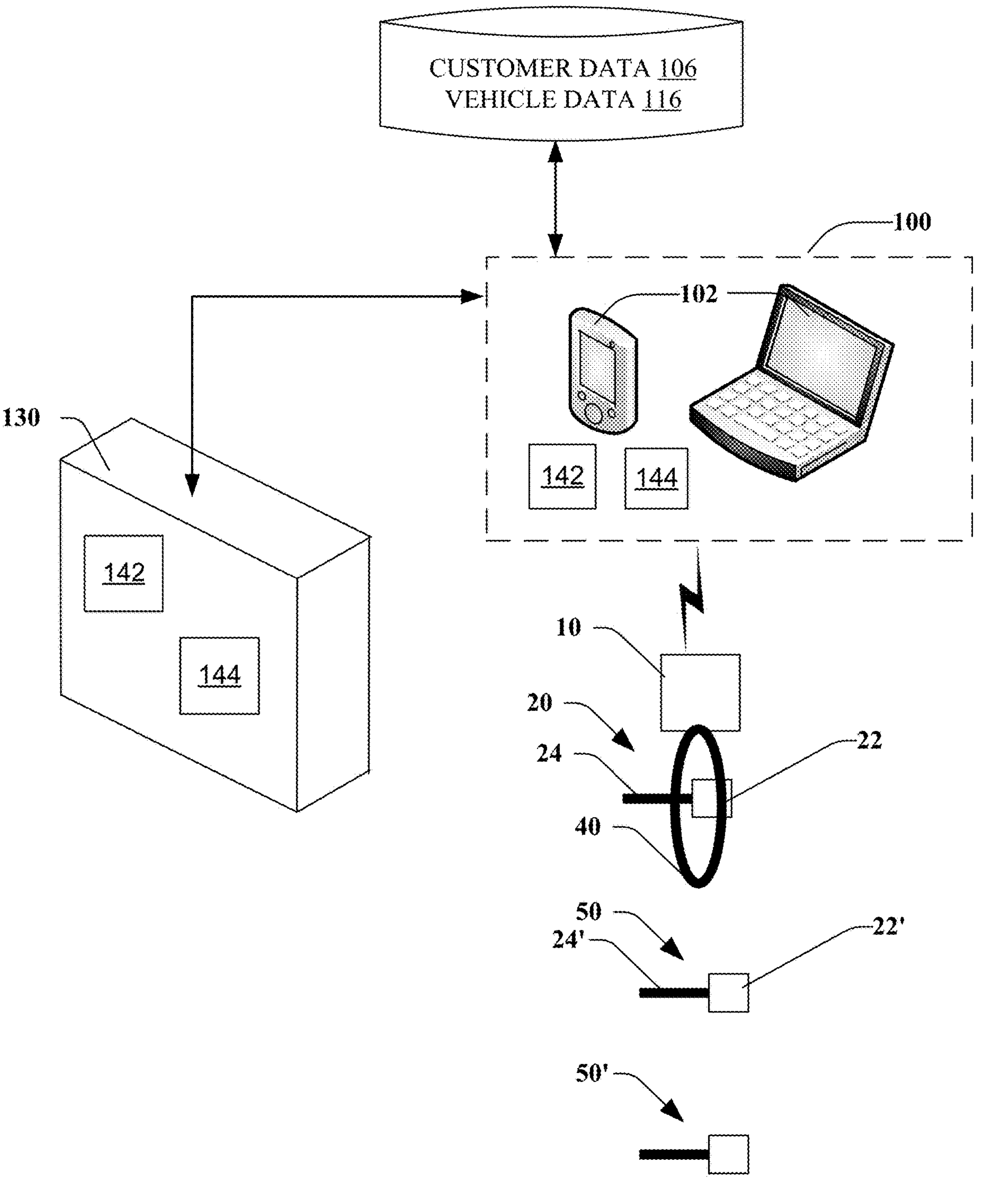
FIG. 4 is a schematic diagram of embodiments of a communication framework of the system for duplicating a master key in accordance with the present disclosure.
Figure 5:
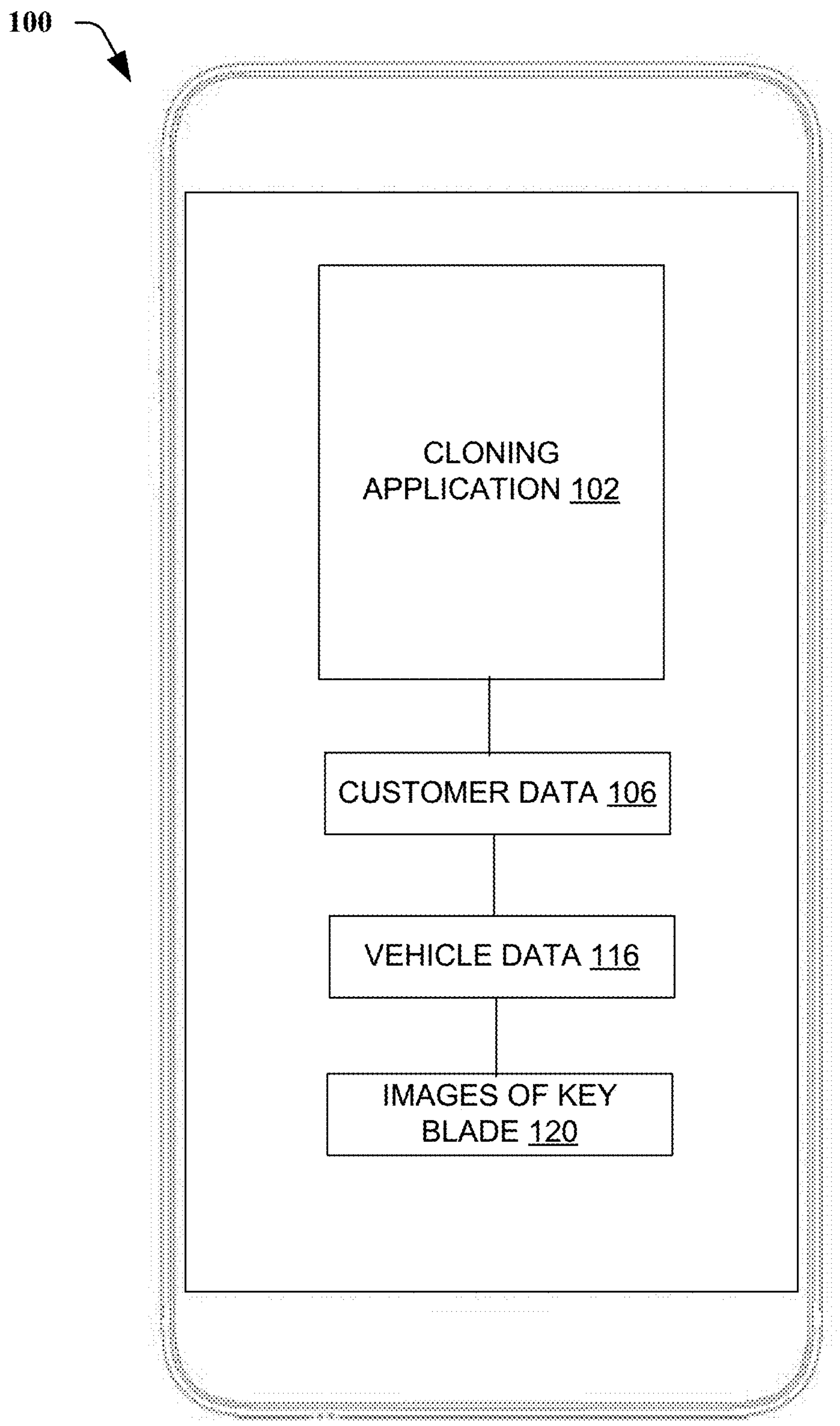
FIG. 5 is a plan view of a computing device associated with the system for duplicating said master key in accordance with the present disclosure.
Figure 6:
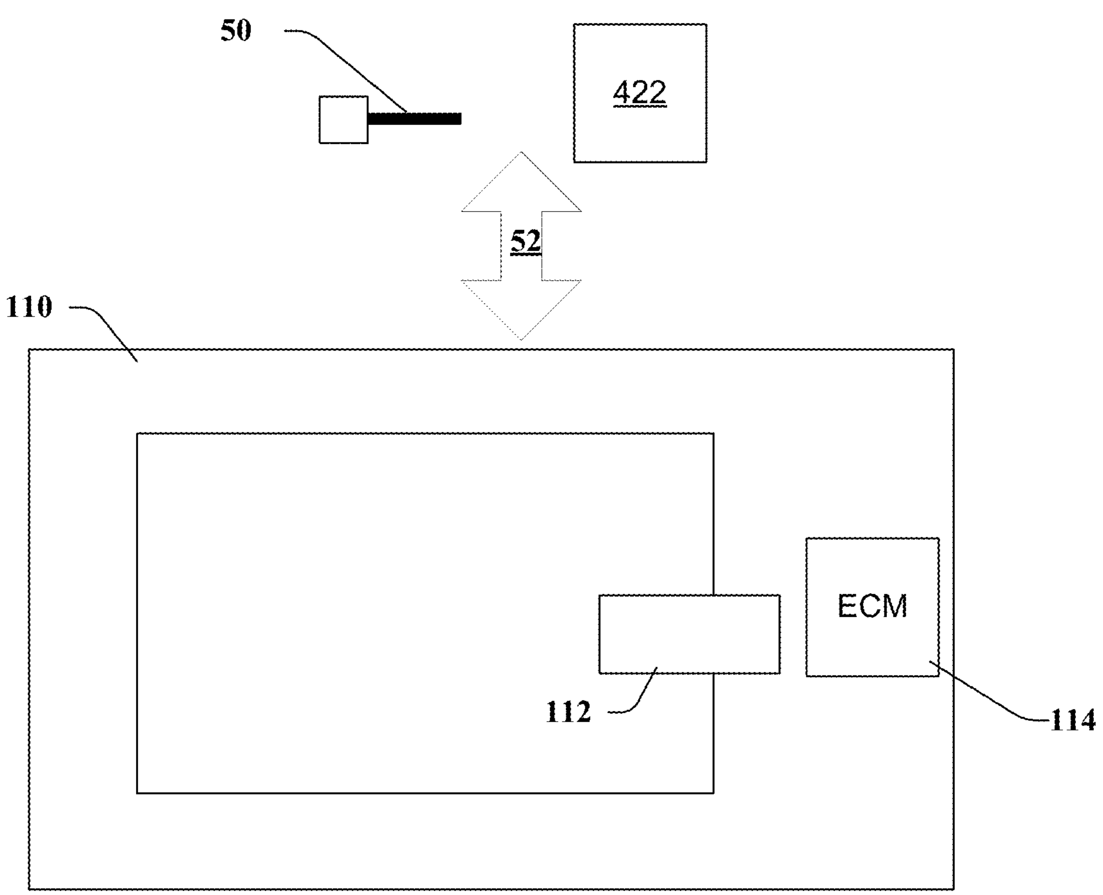
FIG. 6 is a diagram that identifies communication between a vehicle and a generically programmed duplicate key in accordance with the present disclosure.

As illustrated by the diagram of FIG. 4, the consumer 108 may link the electronic access device 22 of the master key 20 with the antenna 40 of the t/r device 10. The security information 118 from the electronic access device 22 of the master key 20 associated with the vehicle 110 may be transmitted to the antenna 40 and communicated from the t/r device 10 to the cloning application 102 of the computing device 100. The computing device 100 may communicate security information 118 to the network server 130. Additionally, customer data 106 and vehicle data 116 may also be communicated to the network server 130.

The network server 130 may include an encryption engine 142 and a secure storage 144. The encryption engine 142 may identify if the security information 118 is encrypted. If so, the encryption engine 142 may process the security information 118 of the electronic access device 22 of the master key 20 to generate cloning security information 148. The cloning security information 148 may be stored on the secure storage 144 along with the customer data 106 and vehicle data 116. In one embodiment, the cloning application 102 may be programmed to include a encryption engine 142 such that the security information 118 may be processed directly on the computing device 100 and may be stored on a local secure storage 144 module. In this embodiment, the security information 118 may be encrypted or, the security information 118 may be a fixed code type and may not require the encryption engine 142.

The cloning security information 148 may be communicated from the network server 130 to the computing device 100 through the cloning application 102. The cloning application 102 may communicate with the t/r device 10 to allow the antenna 40 to transmit the cloning security information 148 to the generically programmed duplicate key 50 to create a cloned duplicate key 50'. The cloned duplicate key 50' may be able to be placed in proximity to a vehicle communications interface 112 to sufficiently meet the security parameters of the vehicle to operate the vehicle similar to the master key 20 and electronic access device 22.

In another embodiment, the master key 20 may include security information that may also require authentication sample data 52 from the vehicle 110 to generate the cloning security information 148. In this embodiment, once the generically programmable duplicate key 50 has been received by the customer 108, the generically programmable duplicate key 50 may be placed in proximity with the vehicle to sample communications between the generically programmable duplicate key 50 and the vehicle 110 to generate authentication sample data 52. The authentication sample data 52 may be transmitted to the network server 130 and processed to generate the cloning security information 148. The cloning security information 148 may then be transmitted to the generically programmable duplicate key 50 through the cloning application 102 on the computing device 100 to generate the cloned duplicate key 50'.

In another embodiment, the master key 20 may include security information that may also require authentication sample data 52 from the vehicle 110 to generate the cloning security information 148. In this embodiment, a separate data collection device 422 may be placed in proximity with the vehicle to sample communications between data collection device 422 and the vehicle 110 to generate authentication sample data 52. The authentication sample data 52 may be transmitted to the network server 130 and processed to generate the cloning security information 148. The cloning security information 148 may then be transmitted to the generically programmable duplicate key 50 through the cloning application 102 on the computing device 100 to generate the cloned duplicate key 50'.

Figure 8:
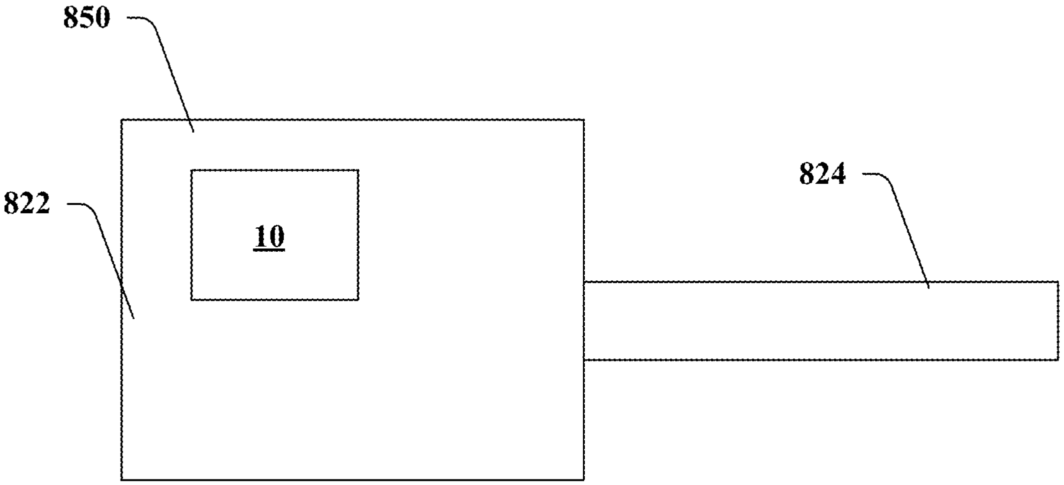
FIG. 8 is a schematic diagram of embodiments of a generically programmable duplicate key.

In another embodiment, the t/r device 10 may be included with the generically programmable duplicate key 850 as illustrated by FIG. 8. Here, the duplicate key 850 may include a generically programmable access device 822 which may or may not also include a blade 824. The access device 822 may include the features and components of the t/r device 10 identified above to allow the generically programmable duplicate key 850 to directly communicate with the computing device 100 to be receive cloning security information 148 and be cloned as described. In one embodiment, the duplicate key 850 may include the computing device communication module 132 as well as the antenna 40. Additionally, in another embodiment, the duplicate key 850 may include the t/r device 10 components including the computing device communication module 132 but without the antenna 40.

In a preferred embodiment, the t/r device 10, generically programmable duplicate key 50, and cloning application 102 may be packaged as a system and offered to customers at a price point that is far lower than existing duplication solutions currently being offered. The costs may be so low that the t/r device 10 may include disposable components. Alternatively, once the generically programmable duplicate key 50 has been programmed, the t/r device 10 may be returned to the supplier in exchange for credit or discounts on future services or products.

Various different embodiments of and assembly and system are contemplated by this disclosure. In one embodiment, provided is a system for master key duplication wherein the clone tool assembly is either disposable or not disposable. In another embodiment, provided is a system that may be combined with a key chain tracker device such as a Bluetooth tracker and/or other key accessories such as a key ring or key chain. Other accessories may include patterned lights, LED lights, bottle openers, key tags, retractable reels, detachable key rings, split rings, straps, multi-tools, carabiners, clips, safety whistles, etc. Additionally, the system 200 may be provided for use by a store associate rather than a customer.

The system 200 provides for a local capability to duplicate some transponder type master keys that include security information (such as fixed codes) that can be communicated to a network server to duplicate other transponder types (such as encrypted). This allows for the sale of transponder type keys that can be duplicated/cloned at the home of a customer or otherwise without having to visit a retail key duplication establishment or locksmith. Additionally, for master keys that include access devices as well as blades with patterned bittings thereon, this system allows for both duplicate blades and access devices to be provided by cutting the blade from a photo or image taken by the customer. The cut blade and blank duplicate key may then be sent to the consumer along with the t/r device to facilitate the remaining steps of programming the access device.

The present disclosure could include systems and methods disclosed by U.S. Pat. Nos. 7,849,721 and 7,890,878 and 8,634,655 and 8,644,619 and 9,818,041. The disclosures of U.S. Pat. Nos. 7,849,721 and 7,890,878 and 8,634,655 and 8,644,619 and 9,818,041 are hereby incorporated by reference in their entireties.

Figure 7:
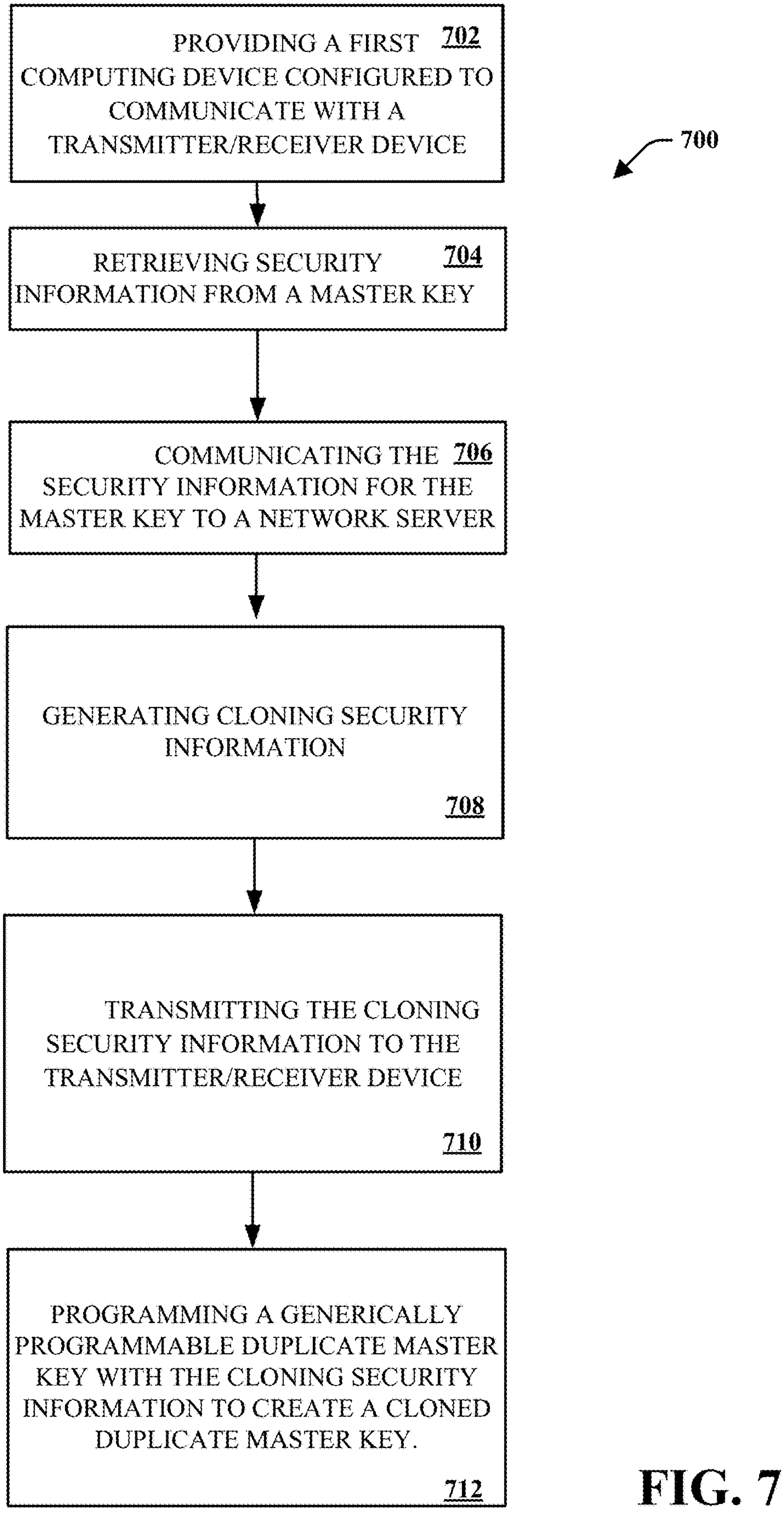
FIG. 7 is a flow chart of one embodiment of a method for the duplicating a master key in accordance with the present disclosure.

FIG. 7 illustrates a schematic diagram of a method 700 of the present disclosure. Provided is a vehicle access device duplication system comprising: a non-transitory computer-readable storage medium storing executing instructions that, when executed, cause a cloning application to perform programmable steps. In a step 702, the cloning application may determine that a first device of a customer is communicating with a t/r device. The t/r device including an antenna for communicating with a master key for a vehicle. In step 704, the cloning application may retrieve security information from the master key. In step 706, the cloning application may communicate the security information for the master key to a network server. In step 708, the network server of the cloning application may generate cloning security information. In step 710, the cloning security information may be transmitted to the t/r device. In step 712, a generically programmable access device may be programmed with the cloning security information. As such, a cloned master key 50' may be securely replicated or created by the customer without having to visit a retail location or hire a locksmith.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A method for duplicating an access device, comprising:

providing a first computing device configured to communicate with a transmitter/receiver device (t/r device), the t/r device including an antenna for wirelessly communicating with a master key for a vehicle;

running a cloning application associated with said t/r device on the first computing device, the cloning application configured to electronically communicate with the t/r device;

retrieving, by the antenna of the t/r device, security information digitally stored by said master key;

communicating, by the cloning application, the security information for said master key to said network server;

generating, by the network server, a cloning security information;

communicating, by the network server, the cloning security information to the cloning application; and transmitting, by the cloning application, the cloning security information to the t/r device to program an electronic access device of a generally programmable duplicate key with the cloning security information.

2. The method of claim 1, further comprising: in response to retrieving, by the t/r device, security information from said master key, determining, by the cloning application, whether the security information is encrypted and generating the cloning security information.

3. The method of claim 1, further comprising: in response to communicating, by the cloning application, the security information for said master key to said network server, determining, by the network server, whether the security information is encrypted; and generating the cloning security information.

4. The method of claim 1, further comprising: capturing at least one image of a blade of said master key, communicating said at least one image of said blade to said network server, cutting a duplicate blade of a generally programmable duplicate key, and providing said generally programmable duplicate key to said customer.

5. The method of claim 1, further comprising: placing said generally programmable duplicate key in proximity with said vehicle, sampling communications between said generically programmable duplicate key and said vehicle to generate authentication sample data.

6. A vehicle access device duplication system comprising: a non-transitory computer-readable storage medium storing executing instructions that, when executed, cause a cloning application to perform steps comprising:

determining that a first device of a customer is communicating with a transmitter/receiver device (t/r device), the t/r device including an antenna ring for wirelessly communicating with an access device for a vehicle;

retrieving security information digitally stored by said access device;

communicating the security information for said access device to a network server;

generating a cloning security information; and transmitting the cloning security information to the t/r device to program a duplicate access device with the cloning security information; and a processor configured to execute the instructions.

* * * * *